No. 857,631.
PATENTED JUNE 25, 1907.
C. W. KENNERLY & B. E. STOCKWELL.
ANTISEPTIC CASE FOR THERMOMETERS.
APPLICATION FILED OCT. 30, 1906.
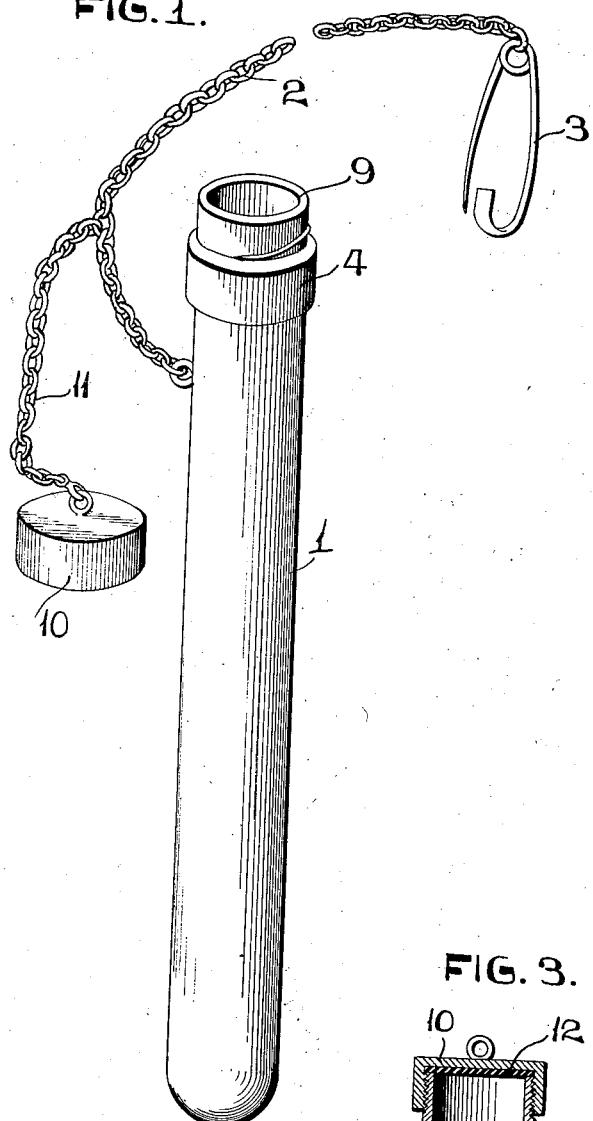
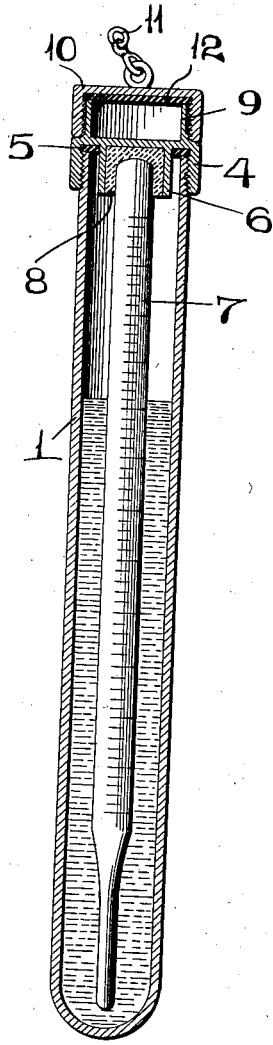
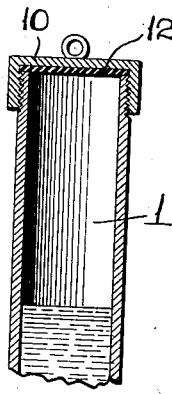
ATTEST.
INVENTORS.
CHARLES W. KENNERLY.
BENJAMIN E. STOCKWELL.
BY
ATT'YS.

UNITED STATES PATENT OFFICE.

CHARLES W. KENNERLY AND BENJAMIN E. STOCKWELL, OF ST. LOUIS, MISSOURI.

ANTISEPTIC CASE FOR THERMOMETERS.

No. 857,631.   Specification of Letters Patent.   Patented June 25, 1907.

Application filed October 30, 1906. Serial No. 341,320.

*To all whom it may concern:*

Be it known that we, CHARLES W. KENNERLY and BENJAMIN E. STOCKWELL, citizens of the United States, and residents of St. Louis, Missouri, have invented certain new and useful Improvements in Antiseptic Cases for Thermometers, of which the following is a specification containing a full, clear, and exact description, reference being had to the accompanying drawings, forming a part hereof.

Our invention relates to an antiseptic case for thermometers, and the object of our invention is to provide a simple pocket case for holding a physician's thermometer while not in use, and which case is partially filled with a suitable anticeptic liquid which will thoroughly sterilize the thermometer, thus effectually preventing the transferring of disease germs from one patient to another by means of the thermometer while in use.

Our invention consists of a tubular case which is to contain the antiseptic liquid, a cap which carries the thermometer, and a cap adapted to close the upper end of the case while the thermometer is removed therefrom.

To the above purposes, our invention consists of certain novel features of construction and arrangement of parts, which will be hereinafter more fully set forth, pointed out in the claims, and illustrated in the accompanying drawings, in which:—

Figure 1 is a perspective view of our improved thermometer case; Fig. 2 is a vertical section taken through the center of the case with both caps in position thereon; Fig. 3 is a vertical section through the upper end of the case, with the thermometer removed therefrom, and the upper end of said case closed by a cap.

In the construction of the device, 1 designates a tubular case, preferably constructed of metal, and of such size as to be readily carried in the vest pocket; and attached to the upper end of said case is a chain 2, on the upper end of which is located a pin 3 by means of which the case is attached to the clothing to prevent its loss.

The upper end of the case is exteriorly screw threaded for a short distance, and is adapted to receive an interiorly screw threaded cap 4; and located within said cap is a packing ring 5, of leather, rubber, or analogous material, which rests on the upper edge of the case 1 when the cap is screwed thereon, and thus prevents leakage of the antiseptic liquid from the case. Formed integral with the under side of the cap 4 is an annular collar 6, in which is located the upper end of the thermometer 7, which is of the usual form and construction, and said thermometer is anchored or fixed to the cap 4 by a body of cement 8 located in the annular collar 6 around the upper end of said thermometer. Formed integral with the top of the collar 4 is a short cylindrical extension 9, which is exteriorly screw threaded.

10 designates an auxiliary cap which is carried by a short section of chain 11, attached to the chain 2, and which cap is interiorly screw threaded and adapted to engage on the cylindrical extension 9, or upon the upper end of the casing 1. Located on the interior of the cap 10 is a disk 12, of rubber, leather, or analogous material, which performs the same function as does the packing ring 5.

When carried in the pocket, the pin 3 is attached to the clothing adjacent the pocket, the case 1 is partially filled with an antiseptic liquid, the cap 4 is positioned on the upper end of the case with the thermometer immersed in the liquid, and the cap 10 is positioned on the cylindrical extension 9. When it is desired to use the thermometer, the cap 10 is removed from the extension 9, after which the cap 4, carrying the thermometer 7, is removed from the case 1, and the cap 10 is now located on the upper end of the case 1 to prevent the discharge of the antiseptic liquid therefrom. The antiseptic liquid adhering to the thermometer 7 is wiped therefrom, and said thermometer may now be used in the ordinary manner. When the thermometer is positioned in the case after use, it is immersed in the antiseptic liquid in said case, and is thereby thoroughly sterilized prior to its subsequent use.

A case so constructed is simple, but a slight degree larger than the cases now in general use, and the thermometer is kept in a thoroughly sterilized condition owing to its being immersed in the antiseptic while not in use.

We claim:—

1. A device of the class described, constructed with a receptacle adapted to contain liquid, a cap normally closing the upper end of said receptacle, a thermometer carried by said cap, and an auxiliary cap normally carried by the first mentioned cap and adapted to close the upper end of the receptacle when the first mentioned cap and thermometer are removed from the receptacle; substantially as specified.

2. In a device of the class described, a tubular receptacle, a cap normally closing the upper end thereof, a thermometer carried by the under side of said cap, a chain fixed at one end of the receptacle, a pin attached to the outer end of the chain, and an auxiliary cap secured to said chain and adapted to close the upper end of the receptacle when the first mentioned cap and thermometer are removed from said receptacle; substantially as specified.

In testimony whereof, we have signed our names to this specification, in presence of two subscribing witnesses.

CHARLES W. KENNERLY.
BENJAMIN E. STOCKWELL.

Witnesses:
M. P. SMITH,
E. L. WALLACE.